United States Patent [19]

Merritt, Jr.

[11] 4,091,181
[45] May 23, 1978

[54] RECHARGEABLE GALVANIC CELL

[75] Inventor: Ben Gilbert Merritt, Jr., Berea, Ohio

[73] Assignee: Union Carbide Corporation, New York, N.Y.

[21] Appl. No.: 829,924

[22] Filed: Sep. 1, 1977

[51] Int. Cl.² .......................................... H01M 10/24
[52] U.S. Cl. .................................... 429/94; 429/231; 429/245; 429/246
[58] Field of Search .......... 429/94, 231, 206, 229–231, 429/246, 249

[56] References Cited

U.S. PATENT DOCUMENTS

| 3,042,732 | 7/1962 | Kordesch ......................... 429/229 X |
| 3,951,687 | 4/1976 | Takamura et al. ..................... 429/94 |

Primary Examiner—Anthony Skapars
Attorney, Agent, or Firm—Eugene Lieberstein

[57] ABSTRACT

An improved rechargeable cell having an anode structure which in its uncharged state comprises a coherent metallic porous body with its pores substantially filled with oxidized zinc and alkaline electrolyte. This anode structure is generated in situ, within the cell, by exposing a predetermined admixture of active zinc metal and an oxide of a metal less anodically active than zinc to an aqueous alkaline electrolyte.

13 Claims, 5 Drawing Figures

NICKEL ZINC CELLS, 0.85 AHR. DESIGN CAPACITY – C/10 DISCHARGE

RECHARGEABLE GALVANIC CELL

This invention relates to rechargeable alkaline cells employing zinc as the active negative anode material.

Theoretically an alkaline secondary cell with a zinc anode should possess a high power density and should be capable of deep discharge cycling over a relatively long cycle life. To approach its theoretical capacity the zinc anode must possess a high replating efficiency under deep discharge conditions and exhibit little decline in anodic capacity after repeated cycling. Unfortunately, with a conventional metallic zinc anode, replated zinc upon recharge does not deposit in the same location, amount and form as originally constituted. This results in a gradual decline of anodic capacity with each recycling. The usual decline in anodic capacity for a rechargeable alkaline cell having a zinc anode has been explained as zinc lost from the anode to the total cell system.

Normally, the cell electrolyte is saturated with ZnO to give soluble alkali zincates. Even though the discharge process may give solid ZnO as a product, the zinc metal is preferentially replated from its location in solution (as a charged zinc species) with the ZnO later dissolving as needed to replenish the deposited dissolved zinc. To insure adequate zinc supply for recharging over may cycles it is not uncommon to provide some additional solid ZnO in the cell even when fully charged. This is necessary because some zinc, originally active, becomes unavailable. Also ZnO formed by discharge may fail to dissolve fast enough in a particular location due to slow diffusion and convection, so that it becomes effectively isolated. Orientational and gravity effects can thus adversely affect cell behavior.

One way to minimize these problems is to form a matrix for the replating of zinc upon recharging the cell. In U.S. Pat. No. 3,042,732, issued July 3, 1962, an anode structure is formed from an admixture of powdered metal zinc and a metal oxide such as lead oxide. A portion of the zinc reacts with the lead oxide to give zinc oxide and lead metal. The lead metal forms on the unreacted zinc and provides the matrix for redeposition of the zinc upon charging the cell.

The present invention represents an improvement over the teaching in the above-identified patent. The final anode structure of the present invention in its uncharged state comprises a "coherent metallic porous body" with its pores substantially filled with oxidized zinc and alkaline electrolyte. The "coherent metallic porous body" is generated by reducing a metal oxide, such as lead oxide or copper oxide, by contact with the active negative electrode starting material, i.e., zinc metal in the presence of an alkaline solution internal to the cell. This metal oxide should be of a metal less active anodically than zinc. The "coherent metallic porous body" is defined for purposes of the present invention as a sponge-like structure of interconnected metallic particles which must have a sufficient volumetric capacity to act as a depository for the zinc oxide species during discharge and give a high surface area to serve as a plating surface for metallic zinc during charge. In order to provide the coherent metallic porous body with sufficient volumetric capacity for the cell requirement it has been found necessary to provide enough metallic oxide to react with approximately all of the starting negative electrode metallic zinc material present at the outset; thereby initially forming an essentially discharged anode structure. To satisfy this criteria the ampere hour equivalent capacity of the metal oxide must be at least about 90% of the ampere hour capacity of the metallic zinc starting material but should not exceed the initial metallic zinc ampere hour capacity.

The anode structure of the present invention is preferably generated in situ, within the cell, by adding to the consolidated admixture of dry starting materials forming the negative electrode a predetermined amount of a suitable aqueous alkaline electrolyte. With lead oxide it is further preferred to provide a surface coating of an electrolyte permeable polymer composition on the consolidated admixture before adding the alkaline electrolyte. It is however necessary, particularly to assure satisfactory electronic conductivity, that the coating material be substantially confined to the outer surface of the negative electrode.

The generation of the anode structure, in situ, is a preferred feature of the present invention which can be utilized with any conventional cell configuration or shape such as the cylindrical and button cell. Moreover, the cathode can be any positive cathode electrode dischargeable and rechargeable in an alkaline electrolyte such as an aqueous KOH or NaOH.

Accordingly, it is the principal object of the present invention to provide a rechargeable alkaline cell having an improved anode structure composed of a coherent porous body of a metal less electrochemically active than zinc with its pores substantially filled with oxidized zinc and aqueous alkaline electrolyte.

Further objects and advantages of the present invention will become apparent from the following detailed description of the invention when taken in connection with the accompanying drawings in which.

Broadly described, the present invention encompasses forming an anode structure within the cell by exposing a consolidated admixture comprising powdered zinc and an oxide of a metal less electrochemically active than zinc, such as lead or copper, in a predetermined proportion to one another, to an aqueous alkaline electrolyte. Upon contact with the electrolyte, the active zinc metal reacts with the metallic oxide reducing the oxide and forming a coherent metallic porous body with its pores substantially filled with oxidized zinc and aqueous alkaline electrolyte. The metallic oxide must be present in an amount having an ampere hour capacity which is substantially equal to the ampere hour capacity of the active zinc anode material and greater than the ampere hour capacity of the cathode. Preferably, the ampere hour capacity of the metallic oxide is from about 90-100% of the ampere hour capacity of the zinc anode material.

Figure 1:
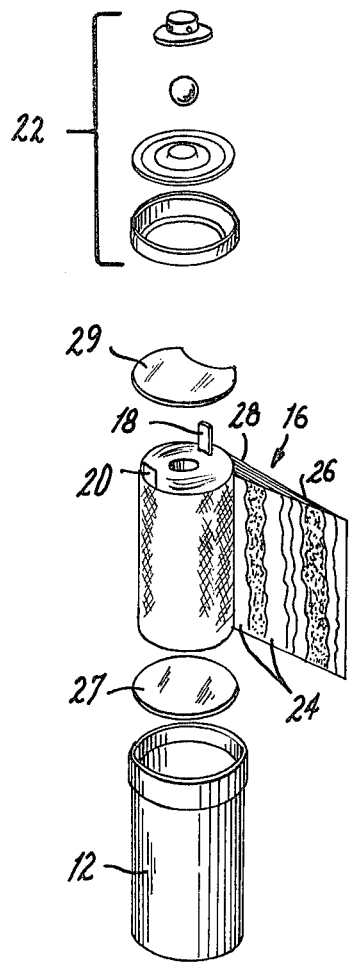
FIG. 1 is an exploded perspective view of a nickel-zinc cylindrical cell assembly having an anode structure formed in accordance with the principles of the present invention.

Referring now to FIG. 1 illustrating a conventional coiled electrode cell construction comprising a cylindrical can 12, an insulating washer 27 which insulates the bottom end of the can 12, a coiled electrode assembly 16, including a cathode 26, an anode 28, and a cover and seal assembly 22. A set of positive and negative conductive tab elements 20 and 18 electrically couple the electrodes 26 and 28 to the can 12 and cover 22 respectively.

The coiled electrode assembly 16 can be constructed in a conventional manner by superimposing elongated sheets or strips of electrode material, which are separated from each other by elongated sheets of separator material 24 and then winding them into a jelly roll or coiled configuration. The cathode 26 can comprise any rechargeable cathode material which will operate in a KOH and/or NaOH aqueous alkaline electrolyte such as, for example, oxides of nickel, silver, copper or manganese.

For a nickel-zinc secondary cell system the cathode 26 may be represented by an impregnated porous nickel sinter formed for example upon a nickel plated perforated steel carrier. The anode 28 is preferably in the form of a pressed powder electrode which can be made following the technique described in U.S. Pat. Nos. 3,310,437 and 3,432,351 using a dry admixture of zinc powder and a powdered metallic oxide of lead or copper. The preferred starting material for the negative electrode (anode) is lead oxide and zinc. The powder admixture is compressed onto a conventional conductive carrier such as an expanded metal grid preferably of amalgamated copper. Alternatively, the negative electrode starting materials may be converted into a paste with the addition of, for example, an aqueous polytetrafluoroethylene suspension which is then applied to an amalgamated copper metal grid and dried. In each case a binder such as for example synthetic microfibers of nylon and/or modacrylic fibers, may be added to further bind the consolidated negative electrode mix together. The copper grid carrier provides a convenient substrate upon which the reduction of the metallic oxide takes place by the active zinc metal upon contact with an electrolyte. It also provides good electrical conductivity for the anode structure and adds to its physical strength.

After lead oxide powder is mixed with zinc powder and applied as a consolidated mass to a grid carrier the negative electrode thus formed must be surface coated before it is exposed to the alkaline electrolyte within the cell. This involves surrounding the outer surface of the negative electrode with an electrolyte permeable polymeric coating of a material with some limited or partial water solubility such as sodium carboxy methylcellulose or other cellulose derivate or polysaccharide, polyacrylamide, polyvinyl alcohol or a copolymer of ethylene and acrylic acid. A surface coating can be formed, for example, by dipping the electrode into a water solution containing from 0.5 to 1.0% by weight of sodium carboxy methylcellulose and drying thereafter. The polymeric coating forms a surface barrier which prevents any $Pb^{++}$ ions from migrating outside the anode before or during the reduction of the lead oxide by zinc metal to metallic lead in the presence of the alkaline electrolyte. The coating should be substantially confined to the outer surface of the negative electrode. This will be assured if the negative electrode preparation includes compression or other consolidation of the admixture of starting materials. The alkaline electrolyte may be added to the cell after the electrode assembly is inserted into the container 12 just prior to the emplacement of the cover and seal assembly 22.

The elongated sheet of separator material 24 can be made from conventional type material such as nonwoven polyamide fabric sold commerically under the trademark "Pellon," modacrylic fabric, polypropylene fabric, fibrous-reinforced regenerated cellulose or the like. The preferred arrangement is to encapsulate the positive electrode 26 in a sheath of non-woven "Pellon" fabric and to place an additional sheet of fibrous cellulose between the positive and negative electrode before rolling up the assembly 16 in the jelly roll configuration. The wound electrode assembly 16 is then inserted into the can 12 with the insulating washers 27 and 29 placed at the bottom and top of the jelly roll electrode assembly 16 to prevent edge shorting. Connection is made between the can 12 and the positive electrode 26 through tab 20 and the negative electrode 28 is coupled through the tab 18 to the cover assembly 22. In electrolyte such as aqueous KOH is then added to the cell. The cover assembly 22 is thereafter sealed in place over the can 12. During the first 24 hours after the cell is closed the electrolyte wets the negative electrode and forms, in situ, the composite porous anode structure of the present invention.

Figure 2:
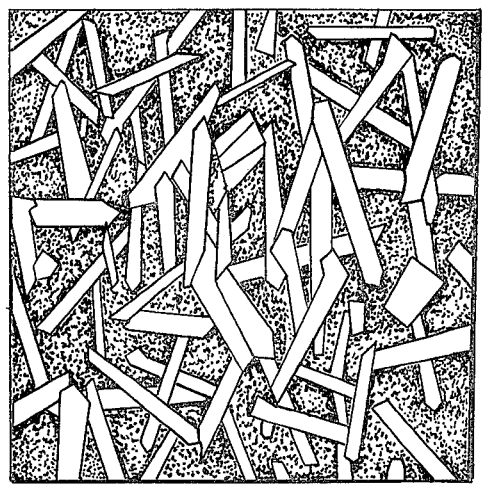
FIG. 2 is a pictorial sectional representation of the coherent metallic porous body of the present invention with the oxidized zinc chemically removed from its pores based upon a scanning electron microscope photomicrograph at 5000 times power (linear magnification)
Figure 3:
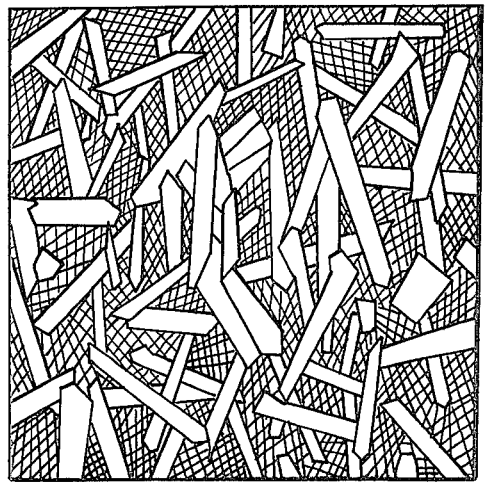
FIG. 3 is a pictorial sectional representation of the anode structure after charging and based upon a scanning electron microscope photomicrograph at 5000 times power (linear magnification)
Figure 4:
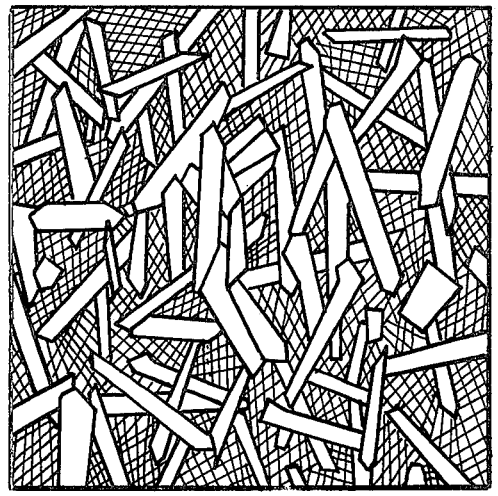
FIG. 4 is another pictorial sectional representation of the same anode structure of FIG. 3 after discharging based upon a scanning electron microscope photomicrograph at 5000 times power (linear magnification)

It is preferred that the uncharged anode capacity be greater than the uncharged cathode capacity to minimize hydrogen evolution during charge and overcharge. To provide a coherent porous metallic structure with sufficient volumetric capacity for the oxidized zinc the metal oxide capacity in ampere hours should approximate the zinc ampere hour capacity. Preferably, the ampere hour capacity of the metal oxide is from 90-100% of the ampere hour capacity of the starting zinc negative electrode material. FIG. 2 provides a pictorial sectional representation of the coherent porous metallic body based upon a scanning electron microscope photomicrograph at 5000 times power (linear magnification). The oxidized zinc and excess metallic zinc were chemically removed before the photomicrograph was taken. The remaining sponge-like structure is a three dimensional network of interconnected filamentary metallic particles. The amount of metal oxide required to form a porous structure having a sufficient volumetric capacity is an essential characteristic of the present invention. During charge the plated zinc coats the filamentary metallic particles in the sponge-like structure as is shown in FIG. 3 and during discharge the oxidized zinc fills the pores or voids between filamentary particles as is shown in FIG. 4. FIG. 3 is a pictorial sectional representation of the charged electrode based upon a scanning electron microscope photomicrograph at 5000 times power (linear magnification). The voids between the filamentary particles act as a depository for the hydrated oxidized zinc ($ZnO \cdot X\ H_2O$) and electrolyte. The discharged electrode shown in section in FIG. 4 is also a pictorial representation based upon a 5000 times scanning electron microscope photomicrograph (linear magnification). As shown, the filamentary particles are coated with oxidized metal and the voids between particles partially filled with electrolyte and more hydrated oxidized zinc (ZnO.X H$_2$O).

EXAMPLE

As an example of the practice of this invention four rechargeable cylindrical cells employing the subject zinc anode with a conventional nickel oxide cathode were constructed and tested. Cells with "Sub-C" in size with a diameter of 0.9 inch and a height of 1.68 inch and were assembled substantially as shown in FIG. 1.

The zinc anode was prepared according to the following procedure.

| Mix Formula: | |
|---|---|
| Zinc Powder (Zn) | 49.54 grams |
| Litharge Powder (PbO) | 135.82 grams |
| Nylon Fibers (3.0 Denier, chopped) | 0.56 grams |
| Mercuric Oxide Powder (HgO) | 14.08 grams |
| | 200.00 grams (Total) |

A portion of the above ingredients (20.0 grams of PbO, 14.08 grams of HgO, and 0.56 grams of Nylon fibers) were first milled in a "Micromill" for 1.0 minute and were then combined with the remainder of the ingredients and the entire mix batch was tumbled in a 1 quart size twin-shell type blender for 1.5 hours.

Each anode strip was made by compressing (at 18,000 p.s.i.) the tumbled mix powder onto an expanded copper strip confined in a steel mold with a steel ram or plunger. The powder was uniformly distributed in such quantity that the final anode strip which was 5.5 inches long, 1.0 inch wide, and 0.020 inch thick contained 9.96 grams of powder. Theoretical anode capacity was 2.02 ampere hour. A suitable metal contact tab was welded to one edge of the strip. Each compressed anode strip was given a single dip into an aqueous solution of sodium carboxy methylcellulose (0.75% by weight) and allowed to dry in the open air.

The opposing nickel oxide electrode strip was cut to 5.756 inch by 1.0 inch in size from conventional factory product impregnated nickel sinter roll stock. It was 0.027 inch thick and the theoretical cathode capacity was 0.929 ampere hour. A contact tab was welded to one edge.

Two separator materials were employed, one enveloping the zinc (negative) electrode and the other enveloping the nickel oxide (positive) electrode.

The negative separator was of a cellulosic film type (sausage casing) and the positive separator was of nonwoven Nylon felt (Pellon #2506). Both materials were commercially available and conventional in the battery art.

An anode strip and a cathode strip, each enveloped in its own separator, were aligned and superimposed and then wound tightly into a jelly roll configuration leaving a 3/16 inch diameter cavity in the center.

The wound jelly roll assembly was inserted into a closely fitting cylindrical steel cup, tab connections were welded to the cup and the cover, the tab and inside of the cover were coated with a protective fatty polyamide material, 4.0 c.c. of aqueous KOH (35% by weight) saturated with zinc oxide was added by a vacuum fill technique, the cover and seal assembly were placed in the top of the container, and the top of the container was radially compressed about the seal and cover. The in situ formation of the porous lead sponge body was complete within 24 hours of sealing the cells.

Figure 5:
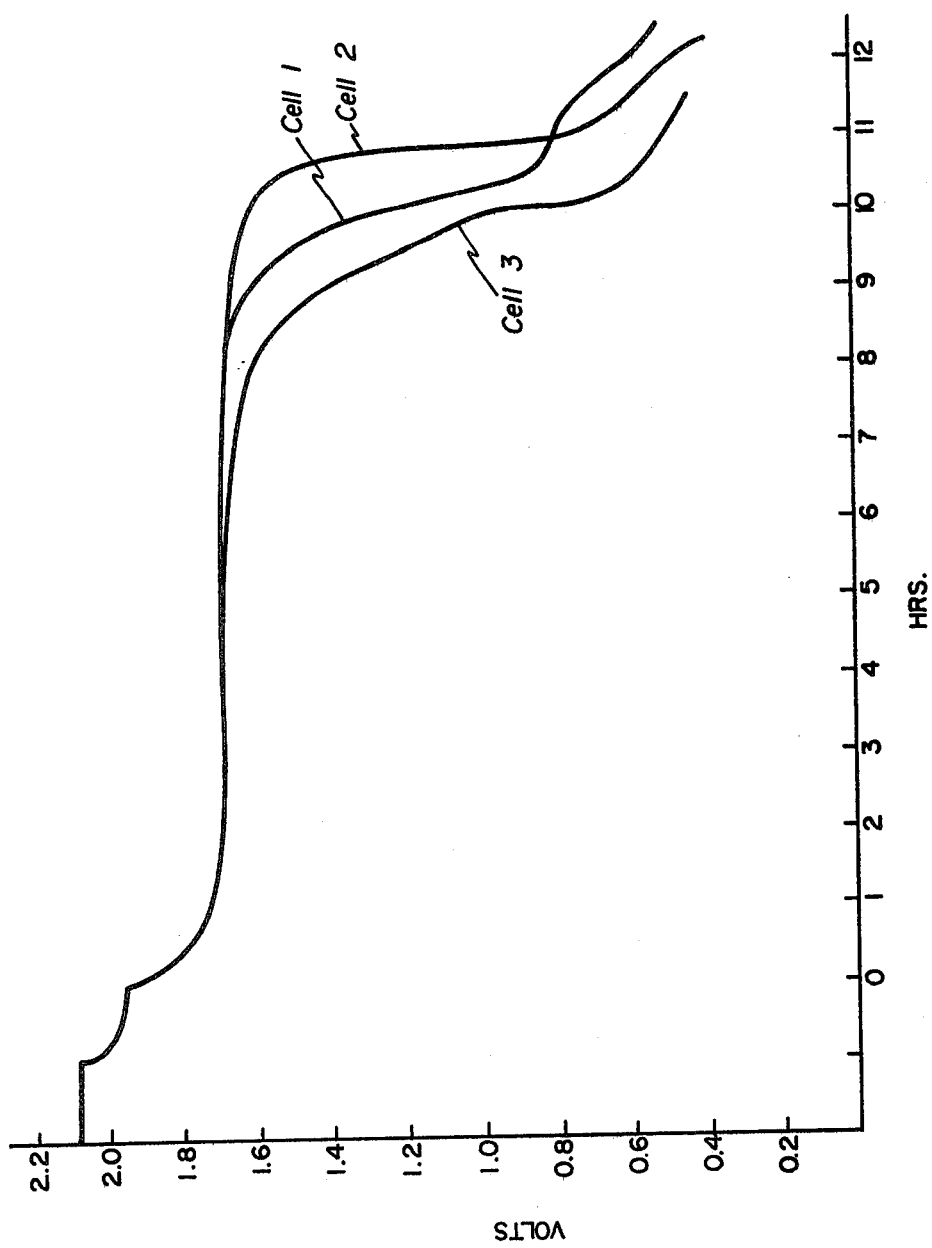
FIG. 5 is an illustration of typical discharge curves for rechargeable alkaline nickel-zinc cells of the present invention for the 14th cycle.

The cells were tested at 72° F over a number of charge-discharge cycles at various constant discharge rates ranging from 1C (0.850 Ampere) to C/10 (0.085 Ampere). Charging was performed in a tapered manner, starting at about 300 milliamperes and dropping to about 40 milliamperes at end of charge. Discharge was continued to 0.5 volt/cell before the recharging; however, ampere hour capacity delivered was calculated to 1.0 volt/cell cut off. FIG. 5 shows actual discharge curves (Volts vs. Time) for three individual cells on the 14th cycle at the 0.1C (0.085 Ampere) rate. The cells gave about 1/3 of rated capacity at the 1C discharge rate, and about 1/2 of rated capacity at the C/2 discharge rate. At the C/5 discharge rate and the C/10 rate approximately full rated capacity (0.850 Ampere-Hour) was obtained. The cells were finally cycled to failure, which required for the best cell about 37 cycles. Examination of the cells indicated a separator problem (shorting) but no failure of the anode.

It is obvious that the in situ (in the cell) formation of the negative electrode, while preferred, is not the only way of forming the porous anode structure of the invention. For example, in the assembly of button cells the powder admixture may be consolidated by the pressure or paste method into the anode cup and the visible exposed surface of the anode compact may be coated with the electrolyte permeable coating by painting or spraying the surface with a dilute solution (0.5 - 1.0%) in water followed by drying. The cell may then be assembled with alkaline electrolyte to give the final electrode structure in situ.

Alternatively, however, the consolidated anode compact can be exposed to aqueous alkaline electrolyte as a separate step prior to cell assembly. The electrochemical reduction of metal oxide to give the desired anode structure proceeds exactly as in the in situ approach. Electrodes or electrode stock so prepared would of course have to be protected from the atmosphere (CO$_2$ absorption, water pick-up and oxidation) because of the alkaline electrolyte incorporated in its structure until such time as the final assembly into cells is completed.

What is claimed is:

1. In a rechargeable galvanic cell having a cathode, an anode in which zinc is the active anode metal, means for separating said cathode from said anode, and an aqueous alkaline electrolyte; the improvement comprising: said anode having a coherent metallic porous structure, formed, in situ, in the presence of said aqueous alkaline electrolyte, from a metal oxide selected from the group consisting of lead oxide and copper oxide with an ampere hour capacity of between 90-100% of the initial ampere hour capacity of the active anode zinc metal, and said coherent metallic porous structure having its pores substantially filled with an oxide of zinc and an aqueous alkaline electrolyte.

2. In a rechargeable galvanic cell as defined in claim 1 wherein said coherent metallic porous structure is composed of lead.

3. In a rechargeable galvanic cell as defined in claim 2 wherein said coherent metallic porous structure is surrounded by an outer polymeric coating confined substantially to the outer surface of said structure.

4. In a rechargeable galvanic cell as defined in claim 3 wherein said polymeric coating comprises a material selected from the group consisting of a partial water soluble cellulose derivative and a partial water soluble polysaccharide.

5. In a rechargeable galvanic cell as defined in claim 4 wherein said polymeric material is sodium carboxy methylcellulose.

6. In a rechargeable galvanic cell as defined in claim 3 wherein said polymeric coating comprises a material selected from the group consisting of polyacrylamide, polyvinyl alcohol, and a copolymer of ethylene and acrylic acid.

7. In a rechargeable galvanic cell as defined in claim 5 wherein said cell is of cylindrical shape with said anode, cathode and separator member wound together in a jelly roll configuration.

8. A rechargeable galvanic cell having an aqueous alkaline electrolyte, a cathode and an anode separated from the cathode and formed in situ within said cell by the process comprising the steps of: forming an admixture comprising powdered zinc and an oxide of a metal less electrochemically active than zinc in a proportion such that the metal oxide has an ampere hour capacity of between 90–100% of the initial ampere hour capacity of said zinc; compressing said admixture; forming said admixture into a predetermined shape; and exposing said admixture to said electrolyte within said cell.

9. A rechargeable galvanic cell as defined in claim 8 wherein said metal oxide is selected from the group consisting of: lead oxide and copper oxide.

10. A rechargeable galvanic cell as defined in claim 9 wherein said metal oxide is lead oxide.

11. A rechargeable galvanic cell as defined in claim 9 wherein said compressed admixture is coated with a polymeric coating comprising a material selected from the group consisting of a partial water soluble cellulose derivative and a partial water soluble polysaccharide.

12. A rechargeable galvanic cell as defined in claim 11 wherein said polymeric material is sodium carboxy methylcellulose.

13. A rechargeable galvanic cell as defined in claim 9 wherein said compressed admixture is coated with a polymeric coating comprising a material selected from the group consisting of: polyacrylamide, polyvinyl alcohol, and a copolymer of ethylene and acrylic acid.

* * * * *